(12) United States Patent
Garcia Morchon et al.

(10) Patent No.: US 11,147,144 B2
(45) Date of Patent: Oct. 12, 2021

(54) CONTROL OF NETWORK LIGHTING SYSTEMS

(71) Applicant: SIGNIFY HOLDING B.V., Eindhoven (NL)

(72) Inventors: Oscar Garcia Morchon, Aachen (DE); Theodorus Jacobus Johannes Denteneer, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/354,616

(22) Filed: Nov. 17, 2016

(65) Prior Publication Data

US 2017/0071048 A1   Mar. 9, 2017

Related U.S. Application Data

(62) Division of application No. 13/996,906, filed as application No. PCT/IB2011/055570 on Dec. 9, 2011, now Pat. No. 9,521,731.

(30) Foreign Application Priority Data

Dec. 22, 2010  (EP) .................................. 10196515

(51) Int. Cl.
*H05B 47/19* (2020.01)
*H05B 47/105* (2020.01)
(Continued)

(52) U.S. Cl.
CPC ........... *H05B 47/175* (2020.01); *H04L 67/12* (2013.01); *H05B 45/00* (2020.01); *H05B 47/105* (2020.01); *H05B 47/18* (2020.01); *H05B 47/19* (2020.01)

(58) Field of Classification Search
CPC ............ H05B 37/0245; H05B 37/0227; H05B 37/0254; H05B 37/0272; H04L 67/12
See application file for complete search history.

(56) References Cited

U.S. PATENT DOCUMENTS 6,525,722 B1 *  2/2003  Deering .................. G06T 9/001
                                                           345/419
9,072,134 B2   6/2015  Welten et al.
(Continued)

FOREIGN PATENT DOCUMENTS

CN          101228812 A     7/2008
DE       102009007526 A1    8/2010
(Continued)

*Primary Examiner* — Henry Luong (57) ABSTRACT

The invention relates to the control of networked lighting systems, particularly large scale networked lighting systems, and more specifically to an efficient transmission of messages to control luminaries of a networked lighting system. A basic idea of the invention is to provide an efficient and flexible multicast, particularly groupcast message that addresses several or a group of luminaires, and that can control the addressed luminaries in an efficient way by compressing the distributed light settings using a function in order to reduce the communicational overhead. An embodiment of the invention relates to a method for controlling a networked lighting system comprising the steps of selecting several controllable luminaries of the networked lighting system (S10), combining control information for each one of the selected luminaries to a set of control information (S12), selecting at least one predetermined function for compressing the set of control information by associating an input related to a selected controllable luminary to the control information for the selected controllable luminary from the set of control information (S14), (Continued)

creating a multicast message addressed to the selected luminaries and comprising information regarding the selected predetermined function (S16), and transmitting the created multicast message (S18).

12 Claims, 3 Drawing Sheets

(51) Int. Cl.
*H05B 47/175* (2020.01)
*H05B 45/00* (2020.01)
*H05B 47/18* (2020.01)
*H04L 29/08* (2006.01)

(56) References Cited

U.S. PATENT DOCUMENTS

| | | | | |
|---|---|---|---|---|
| 2004/0160199 | A1* | 8/2004 | Morgan | A01M 1/04 |
| | | | | 315/312 |
| 2010/0277340 | A1* | 11/2010 | Julio | H04Q 9/04 |
| | | | | 340/9.11 |
| 2011/0234366 | A1 | 9/2011 | Feng et al. | |

FOREIGN PATENT DOCUMENTS

| | | | |
|---|---|---|---|
| WO | 2008068728 | A1 | 6/2008 |
| WO | 2008142639 | A1 | 11/2008 |
| WO | 2009090601 | A1 | 7/2009 |
| WO | 2009126024 | A1 | 10/2009 |
| WO | 2009156900 | A1 | 12/2009 |

\* cited by examiner

CONTROL OF NETWORK LIGHTING SYSTEMS

CROSS-REFERENCE TO PRIOR APPLICATIONS

This application is a Divisional application of U.S. Ser. No. 13/996,906, filed on Jun. 21, 2013, which is a U.S. National Phase application under 35 U.S.C. 371 of International Application No. PCT/IB2011/055570, filed on Dec. 9, 2011, which claims the benefit of European Patent Application No. 10196515.0, filed Dec. 22, 2010. These applications are hereby incorporated by reference herein.

TECHNICAL FIELD

The invention relates to the control of networked lighting systems, particularly large scale networked lighting systems, and more specifically to an efficient transmission of messages to control luminaries of a networked lighting system.

BACKGROUND ART

In the future, networked lighting systems will evolve particularly due to new developments on lighting sources such as LED (Light Emitting Diode) luminaries leading to a higher number of light sources. Networked lighting systems with a high number of light sources or luminaries are also referred to as large scale networked lighting systems.

In conventional networked lighting systems, control is performed by using commands, which are transmitted over the communication medium of the lighting systems to set, for example, the light levels of the luminaires. These commands can be unicasted, addressing one luminaire, to set the light level of this luminaire to a specified value. Alternatively, such commands can be multicasted, addressing several luminaries, for example groupcasted or broadcasted, addressing a group of luminaires or the entire network, i.e. all luminaries of a lighting system. However, all these approaches require transmitting the individual light settings of each luminaire, and thus, they require high bandwidth and limit the efficiency and flexibility of the final system.

SUMMARY OF THE INVENTION

Therefore, it is an object of the invention to improve the control of a networked lighting system.

The object is solved by the subject matter of the independent claims. Further embodiments are shown by the dependent claims.

A basic idea of the invention is to provide an efficient and flexible multicast, particularly groupcast message that addresses several or a group of luminaires, and that can control the addressed luminaries in an efficient way by compressing the distributed light settings using one ore more functions in order to reduce the communicational overhead. Each luminaire addressed by the multicast message can recover its particular light setting by evaluating the function(s) particularly in its location coordinate or address and can set its lighting, particularly its light levels to the outcome of this operation set. Thus, the invention allows to address and control several luminaries with one multicast message, which requires less transmission bandwidth in the network of a networked lighting control system compared to unicast messages for each addressed luminary or a traditional multicast message, with which the same light settings can be applied to all luminaries addressed by this multicast message, but not individually. It should be noted that herein a multicast message means any message in a networked lighting system addressed to several luminaries, while an unicast message is addressed to only one specific luminary. A groupcast message is a multicast message addressed to a group of luminaries in a networked lighting control system, and a broadcast message is addressed to all luminaries of the system. Thus, the general term "multicast message" comprises also groupcast and broadcast message.

An embodiment of the invention provides a method for controlling a networked lighting system comprising the steps of
  selecting several controllable luminaries of the networked lighting system,
  combining control information for each one of the selected luminaries to a set of control information,
  selecting at least one predetermined function for compressing the set of control information by associating an input related to a selected controllable luminary to the control information for the selected controllable luminary from the set of control information,
  creating a multicast message addressed to the selected luminaries and comprising information regarding the selected predetermined function, and
  transmitting the created multicast message.

The selected predetermined function may associate luminary information and contextual information as input related to a selected controllable luminary to the control information for the luminary from the set.

The luminary information may be an address of a luminary and the address may be related to a physical position of the luminary in space or to a logical ordering of the luminaries of the networked lighting system.

The luminary information may also be selected from the following: luminary type, luminary orientation, luminary angle, luminary location, luminary color type.

The contextual information may be selected from the following: time, room temperature, light level, room occupancy, activity in the room. The information regarding the selected predetermined function may comprise an indication to the selected predetermined function or the selected predetermined function.

The selected predetermined function may be parameterized and the multicast message further may comprise parameters of the selected predetermined function.

The selected predetermined function may be selected from the following group:
  a step function and the information regarding the selected predetermined function comprises a start value of the function and a difference between successive values of the function;
  a polynomial (particularly of low degree);
  a periodic function and the information regarding the selected predetermined function comprises a basic function and direction or period.

The control information for a selected luminary may comprise one or more of the following: an intensity value; a dimming value; a color setting value; a beam width; a beam direction.

The created multicast message may comprise
  a network prefix field identifying the network for transmitting the multicast message,
  a message type field identifying the message as multicast message,
  a luminary related information field identifying one luminary or a group of luminaries of the networked lighting system, and a features field identifying a predetermined function and parameters of the predetermined function.

The multicast message is transmitted with wireless communication protocol ZigBee™ or 6LoWPAN (IPv6 over Low power WPAN (Wireless Personal Area Network)) or CoRE.

The at least one function for compressing the set of control information may depend on parameters being computed to fit specific lighting needs with a computer program for lighting control in a light environment, wherein the computer program comprises
- a target light distribution for the light environment,
- an optimization process to calculate lighting settings of light sources for a number of parameters to obtain the target light distribution in the light environment, and
- a modelling process to model the lighting settings of the light sources as a function dependent on a number of parameters.

A further embodiment of the invention relates to a lighting controller for a networked lighting system comprising
- a memory storing a program for implementing a method of the invention and as described herein,
- a processor being configured by the program stored in the storage means to implement the method of the invention and as described herein, and
- a transmitter for transmitting a multicast message created by the processor over a network of a networked lighting system.

A yet further embodiment of the invention relates to a method for processing a multicast message for controlling a networked lighting system, which is created with a method of the invention and as described before, comprising the steps of
- determining information regarding the selected predetermined function contained in the multicast message,
- determining control information from the predetermined function by using an input related to a controllable luminary, and
- outputting the determined control information to the controllable luminary.

A still further embodiment of the invention relates to a luminary for a networked lighting system comprising
- a receiver for receiving messages from a lighting controller of a networked lighting system,
- a memory storing a program for implementing a method of the invention and as described before, and
- a controller being configured by the program stored in the storage means to implement the method of the invention and as described before and to set a lighting created by the luminary in accordance to an output control information, determined by the controller from a received multicast message.

Another embodiment of the invention provides a computer program enabling a processor to carry out the method according to the invention and as specified herein.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

In the following, functionally similar or identical elements may have the same reference numerals.

The term "lighting system" used in the following refers to a networked lighting system, i.e. a lighting system with a network for connecting all luminaries with one or more lighting controllers via a wired and/or wireless network.

The term "luminary" refers to a light source with a control interface, i.e. an electronic circuitry for controlling a lighting in accordance with a control command received over a network of a networked lighting system particularly from a lighting controller. A luminary may comprise one or even more light sources, for example several LEDs, which are controlled by the same control circuitry. A luminary does not have to contain control circuitry and light source(s) in a one unit, for example in the same housing, instead the control circuitry may be also arranged external and provided to control several light sources for example via a bus interface.

A message transmitted in a networked lighting system according to the invention may comprise a command, for example to instruct luminaries to set their lighting to specified intensity or color or hue or the like. A command comprises control information of the lighting settings of luminaries. A message comprises a header and a payload. The payload of a message may comprise a command for a luminary to set for example its intensity level.

In the coming years, lighting systems are going to evolve due to a number of reasons including: (i) new developments on lighting sources such as LED luminaries leading to a higher number of light sources, (ii) luminary-to-luminary wireless communication capability, and (iii) new user and system needs regarding the user comfort, seamless interaction, or reduction of energy consumption.

These developments and needs are introducing, already today, several changes in the way of deploying, interacting with, and controlling lighting systems used in a multiple of environments including offices, hotels, or home. As a lighting system will comprise a very high number of devices, traditional approaches used to install and interact with the system will become obsolete in the sense that the individual management of light sources becomes impractical or slow. Other methods are going to be needed to manage multiple lighting sources in a smart and unobtrusive manner without the burden of having to control each and every of the many lighting devices of the system.

These issues are very relevant for smart LED retrofit lamps (sLrL). In such an sLrL system, smart lamps will be outfitted with wireless interfaces and new control algorithms allowing them to discover, recognize, and cooperate with close-by sensor devices. One of the features of those systems is the capability of creating complex light settings or continuously adapting to external light contributions (sun light) in order to reduce the energy requirements.

In such large-scale lighting systems, it is required to set a multitude of light sources to specific light settings. In this setting, a large-scale lighting system is usually managed by a lighting controller. In some installations, the scope of a lighting controller might be restricted to a room level. For the following, it is assumed that a lighting controller can communicate with each and every light source in a lighting network and transmit a given light setting that should be adopted without delays or at a given point of time. It is further considered that the lighting controller might wish to control the whole network (n nodes) or a part of the network comprising q<n nodes. A node is a light source or luminary of a networked lighting system.

Currently, there are a number of methods to do this. Firstly, in conventional networked lighting systems, commands are transmitted to the individual luminaires to set the lights at the luminaires to some specified setting. However, if the networked lighting system is very large and comprises many luminaires (as described above), then this is an inefficient procedure, as messages comprising commands need be sent to all luminaires in the system. This is time consuming, uses a lot of bandwidth on the communication medium, and may lead to a large jitter in that the first of these commands may be received significantly later than the last of these commands. This in turn may lead to visual imperfection of the lighting system as the turning on and off of groups of lamps may be poorly synchronised. This latter deficiency is sometimes referred to as the popcorn effect. Synchronization algorithms might be implemented to address this issue; however, they are complex to implement and add overhead and delay to the whole system.

Some communication media offer a multicast message to address a group of nodes in a communication network with one command. E.g. if the network is a bus-type, a transmitted command can be received by all nodes in the network. Examples of such bus-type networks are DALI (Digital Adressable Lighting Interface) and wireless systems. However, also when not all nodes are in communication range, and mesh or multi-hop communication may be needed, the network may offer some multicast message that is much more efficient than sending a series of unicast messages to the individual lamps. E.g. some IP (Internet Protocol) networks offer flexible and efficient multicast mechanisms.

Alternatively, some standards allow luminaires to be assigned a group address. In such cases, a second approach is possible, and a light setting command may be sent to this group address. This command causes all luminaires with this group address to set the light values according to this command. This increases efficiency, as only one command need be multicast. However, these approaches lack the flexibility required by adapting to environmental lighting conditions. E.g., if a light level setting command is group-cast, all lamps assume the same light level. If a scene is group cast then scenes must be preprogrammed. However, it is not possible to pre-program scenes for all possible environmental lighting conditions, as there is an upperbound to the number of scenes that can be handled by luminaires, and pre-programming scenes involves a lot of work. Indeed, in practice, daylight adaptation is programmed using two scenes (say) only, with substantial loss in energy savings.

Therefore, the above described technologies offer no adequate tools to continuously adapt the lighting levels to environmental conditions, except by sending very many unicast commands. This approach has the drawback of being very inefficient and gives rise to the problems indicated above.

In contrast to his, a multicast (broadcast) message according to the invention enables to flexibly set the light levels at the luminaires to individual, differentiated, values without making use of scenes.

In the following, it is assumed that a lighting control network is implemented on top of a network technology that offers efficient multicast/broadcast. Examples are, as indicated, bus-type networks such as e.g. DALI and wireless networks. ZigBee and often IP protocols offer efficient multicast procedures.

The invention proposes an efficient procedure for the efficient multicast/broadcast of lighting settings (control information for luminaires) in which the lighting controller instead of sending unicast messages $U_i$ of size $W_i$ with information $I_i$ to each light source i with i=1, . . . , q (n) performs the following steps:

First, the set of information $S_i$ to be distributed is compressed where $S_i = \{I_1, \ldots, I_{q(n)}\}$ Second, a multicast/broadcast message that will be addressed to q(n) nodes is constructed and transmitted Third, each lighting source in the network combines the received multicast/broadcast message and its own values corresponding to the luminary information such location (or identification) information and its own values for the contextual information (such as temperature, number of people in the room) to calculate the specific light configuration it should take.

As already pointed out, a straightforward multicast (or broadcast) approach would consist in the transmission of the content of the unicast messages in the multicast (or broadcast) message. However, this approach does not reduce the size $\Sigma W_i$ of the information that has to be transmitted.

Instead, the invention proposes to compress the size of the information as form of a function F such that the size of the function is less than the size of the unicast messages, i.e., $W_F < \Sigma W_i$. An example of such a function is a periodic function $F(x,y) = F(x+T_x, y+T_y)$—where $T_x$ and $T_y$ are the spatial periods in the X and Y axis, respectively—such that the light setting of a lamp is calculated by evaluating $F(x,y)$ at the location of the lamp. The multicast (or broadcast) message is constructed by including the function F or an indication to the function in the payload of the message. Finally, a light source adapts its light settings based on the function F. To this end, a given light source evaluates the function at a given point P determined from its location, coordinates, address, or other information related to the light source.

Another example is a function $F(x,y,T,t,E)$ in which the function depends on location information and on the room temperature T, the time t, and the amount of light due to external sources E. This allows a network controller to broadcast the basic configuration in the form of the function F and the luminaires will adapt the light settings according to the specific time of the day and the temperature and sunlight. This contextual information might be gained locally on each luminaire (e.g., by means of a temperature or light sensor) or might be broadcasted on a regular basis.

A multicast message created according to the invention can also contain multiple functions, with each function provided for controlling one parameter of a luminary. For example, a multicast message can contain one function for controlling lighting intensity and a further function for controlling lighting color.

Figure 1:
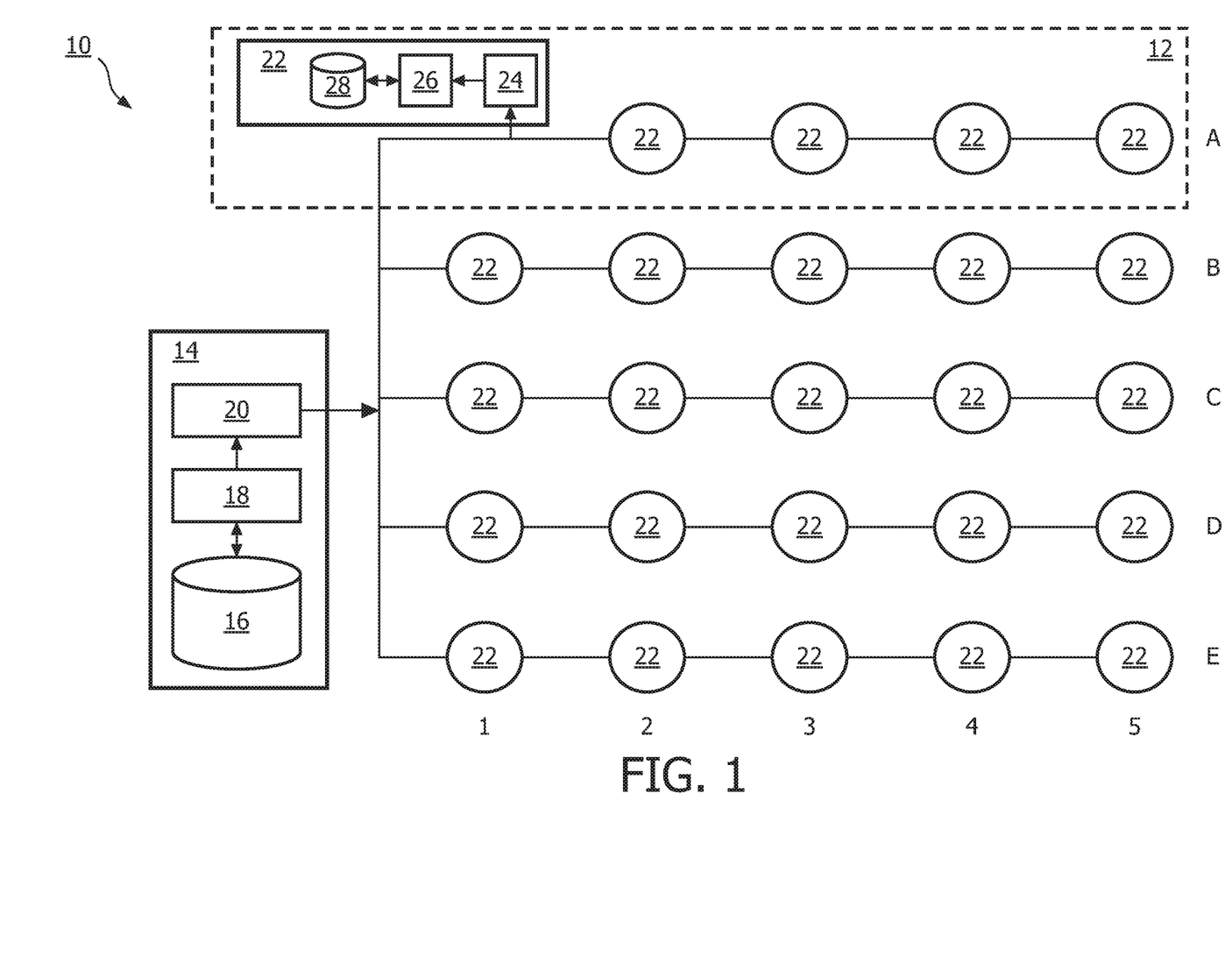
FIG. 1 shows an embodiment of a networked lighting system with a lighting controller and luminaries according to the invention.

FIG. 1 shows a networked lighting system 10, which comprises a lighting controller 14 and a network of several luminaries 22, for example installed in an office. The lighting controller 14 can transmit a message to each of the luminaries 22, which may comprise control information for the luminary 22, addressed by the message. The control information may comprise a command for a desired light setting of the addressed luminary 22, for example to set its lighting intensity to a certain level.

The lighting controller 14, which may be implemented for example by a PC (Personal Computer) configured with a dedicated software for lighting control, comprises a memory 16 (for example a ROM, RAM, Flash, SSD, HDD, CD, DVD) storing the software and a processor 18 (for example a standard PC processor or a special microcontroller for lighting systems) configured by the software to control the lighting created by the luminaries 22. The lighting controller 14 further comprises a transmitter 20 for transmitting messages over the network to the luminaries 22. The transmitter 20 may be for example adapted to communicate according to a wired or wireless communication technology, particularly according to one or more of the following standards or technologies: ZigBee™, WiFi™, Bluetooth®, Ethernet, DALI, IP enabled network such as 6LoWPAN/CoRE.

Each of the luminaries 22 is adapted to receive messages from the lighting controller and to set its lighting in accordance with a control information contained in a received message. For receiving the messages, a luminary 22 comprises a receiver 24. A luminary 22 further comprises a memory 28 (for example a ROM, RAM, Flash) and a controller 26 (for example a microcontroller) configured by a program stored in the memory to process received messages and to set a lighting created by the luminary 22 in accordance with a control information contained in the processed message and obtained by the message processing.

In the networked lighting system 10, each luminary 22 has an unique address, for example a MAC (Medium Access Control)-Layer address, or an IP address if the network of the system 10 is an IP based network. Furthermore, the address of each luminary 22 of system 10 can be related to a logical ordering of the luminaries, as indicated in FIG. 1 by the matrix arrangement of the luminaries and the column (1-5) and line (A-E) indices: for example the luminary 22 arranged in the lower left corner of the matrix has the logical position "E1" in the matrix, while the luminary 22 in the upper right corner has the logical position "A5". The relation between the addresses and logical positions of the luminaries 22 can be stored in the lighting controller 14, for example during commissioning of the system 10.

In the networked lighting system 10 there may be other luminary information available that differs among the luminaires. This luminary information may relate to parameters inherent to the luminaire and its configuration such as the orientation of the luminaire (e.g., pointing to a wall or to the floor), the angle with respect to the perpendicular to the ceiling, the width of the light beam if the luminaire allows for an adaptive beam width, the type of luminaire.

In the networked lighting system 10 the luminaries may have access to=contextual information such as time, room temperature, amount of external light, number of users in the room, type of users in the room, type of activity carried out in the environment, etc.

Figure 4:
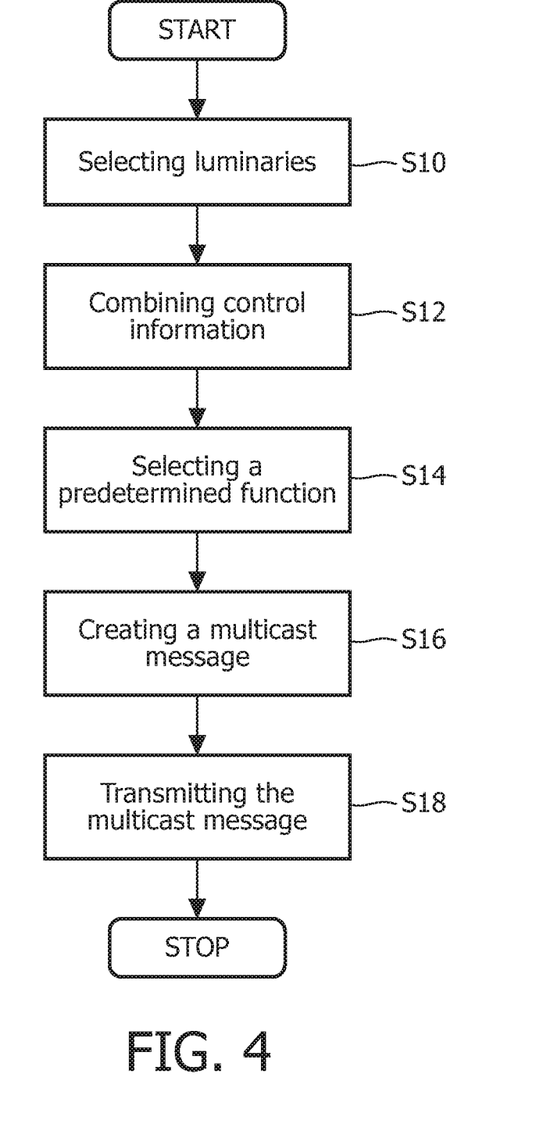
FIG. 4 shows a flowchart of an embodiment of a method for controlling a networked lighting system according to the invention

Next, the controlling of luminaries with a multicast message according to an embodiment of the invention is explained with reference to FIG. 4 showing a flowchart of a method for controlling the luminaries. The method can be executed by the lighting controller 14 and implemented by a program stored in the memory 16 and executed by the processor 18 of the controller 14. In FIG. 1, the luminaries 22 in line "A" are selected for control and grouped together (reference numeral 12; step S10 of the method of FIG. 4). Control information for the luminaries of the group 12 of selected luminaries is combined to a set of control information in step S12. Then, a predetermined function for compressing the set of control information is selected in step S14. This predetermined function may depend on parameters that are computed to fit the specific lighting needs. The parameters can be computed with a computer program for lighting control in a light environment. The program may comprise a target light distribution for the light environment. Lighting settings of light sources may be calculated by an optimization process for a number of parameters to obtain the target light distribution in the light environment. A modelling process may model the lighting settings of the light sources as a function dependent on a number of parameters. The predetermined function associates an input related to a selected luminary, for example the network address or the logical position, to the control information for the luminary from the set of control information. Thereafter, a multicast message is created in step S16, which is addressed to the selected luminaries 12 and in step S18 transmitted to the selected luminaries 12 over the network of the system 10 using the applied network protocol, for example IP or ZigBee™.

A luminary 22 processes a received multicast message as briefly outlined in the following: it determines information regarding the selected predetermined function from the multicast message by processing the payload of the message, which contains either the function itself or an indication to the function. If it contains an indication to the function, the luminary 22 loads from its internal storage the indicated predetermined function. Next, the luminary 22 determines control information from the predetermined function by using an input related to the luminary. The input can be for example derived from a position information contained in the message, for example the position of a leading luminary for the control, or the input can be the luminarie's logical position in the networked lighting system, or its absolute position determined by GPS coordinates or its network address (for example IP- or MAC-address). The luminary calculates by using the determined input and the predetermined function its control information, for example its light settings such as intensity values.

In the following, two aspects of the invention are discussed, namely

Aspect 1: What kind of functions F to use and how to encode these functions in the command contained in the multicast message.

Aspect 2: What kind of location coordinates or address to use in the scheme as input for the function.

Using combinations of the possible embodiments for aspects 1 and 2 provides various ways to specify commands to be used in a lighting control standard that uses multicast (or broadcast) to set the light levels at the luminaires to individual, differentiated, values. The various combinations differ in versatility and efficiency, and ease of use.

Below some possible options for aspect 1 and 2 are explained.

Aspect 2 considers addresses to use in evaluating the function. The hardware of a luminairy usually provides a hardware address for the device (e.g. a MAC address). Another option is obtained using the addresses that are generated when commissioning the system. These addresses may be related to the physical position of the luminaire in a space, or more related to a logical ordering of the luminaires (e.g. the logical addresses as used in the system shown in FIG. 1). Options for such addresses are listed in the following:

Often, upon commissioning, the luminaires are provided with their GPS location, which may be a coordinate in physical space.

As an extension, the command of the multicast message specifies an origin for the function, and a luminaire uses its coordinates relative to this origin. Also, a function of its coordinates and the origin can be used, such as the distance to the origin.

When establishing a multicast group, it may be possible to order the luminaires in the group, and the luminaire can use its pre-fixed order when evaluating the function.

Often luminaires are arranged in some repetitive pattern such as a linear arrangement (e.g. outdoor), a grid (e.g. office environment, refer to FIG. 1), or a (hierarchical or hexagonal) grid. It is possible to allocate a logical address to a luminaire in such a regular arrangement based on is position (e.g. its coordinates in the grid, or its sequence number in a linear arrangement). This logical location can then be used.

Again, as an extension, the command may specify a logical origin for the function, and the luminaire uses its logical coordinates relative to this logical origin. Also, a function of its coordinates and the origin can be used, such as the distance to the origin.

Next, aspect 1 is explained, i.e., what functions to use and how to encode this function in the command of the multicast message. In the following, a number of possibilities is listed:

The approach can be based on a number of predetermined functions stored on the luminaires. The command may then index the appropriate function, e.g. by a number.

Additionally, the function can be parameterised, so that the command additionally includes parameters.

The function can be a step function. As light settings are expected to vary smoothly over luminaires that are close to each other such a step function may be efficiently coded by specifying the start value and a difference between successive values (as shown for example in FIG. 2).

Alternatively, and again exploiting that the light settings are expected to vary smoothly over luminaires that are close to each other, the function can be specified via a polynomial. Polynomials of low degree are preferred to reduce the communication requirements, but the invention is not limited to them Finally, the function can be a periodic function so that the basic function is provided together with other parameters such as direction or period (as shown for example in FIG. 3).

Using combinations of these possibilities, embodies various ways to specify commands to be used in a lighting control standard that use multicast to set the light levels at the luminaires to individual, differentiated, values. The various combinations differ in versatility and efficiency, and ease of use.

Figure 2:
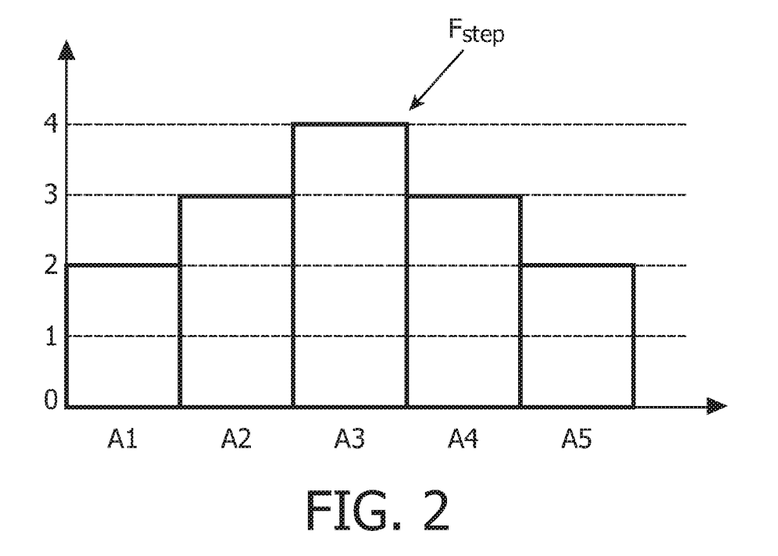
FIG. 2 shows an embodiment of a function for compressing the a of control information for luminaries of the networked lighting system of FIG. 1 according to the invention.

FIG. 2 shows the graph of a step function $F_{step}$ in one dimension as an example of a predetermined function. This function can be selected for adjusting the lighting intensity of the group 12 of luminaires 22 in the system shown in FIG. 1 (input of the function is the logical position of the luminary of the group 12, the output of the function is the intensity level). The only information contained in the multicast message must be either the step-function itself or an indication to the step-function and the logical position "A3". When a luminary of the group 12 receives the multicast message, it can adjust its lighting intensity depending on its position and in accordance with the step-function. This is shown by the graph of FIG. 2, where the luminary at the logical position "A3" adjust its intensity level to the maximum "4", while its direct neighbors in the group 12 at logical positions "A2" and "A4" adjust their intensity levels to the maximum−1 (step −1), i.e. to 3, and the luminaries at the logical positions "A1" and "A5" adjust their intensity levels to maximum−2=2 (distance between "A3" and "A1" or "A5" is 2, thus step is −2). Thus, instead of transmitting 5 unicast messages with commands to set the intensity levels to the luminaries of the group 22, one multicast/groupcast message is sent to the group 22 of luminaries, which contains less information than a multicast/groupcast message containing simply all logical positions and respective intensity values of the luminaries of the group 22.

Figure 3:
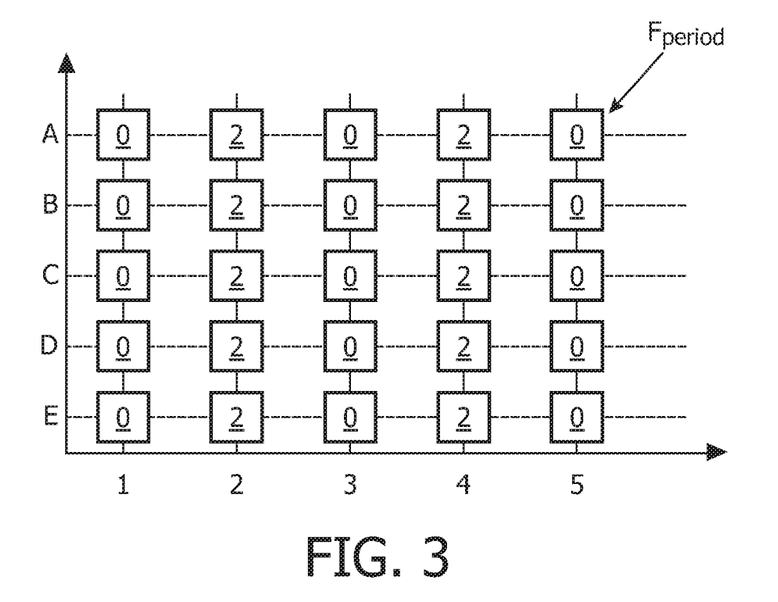
FIG. 3 shows a further embodiment of a function for compressing the a of control information for luminaries of the networked lighting system of FIG. 1 according to the invention.

Another example of a predetermined periodic function $F_{period}$ is shown in FIG. 3. This function can be selected to adjust the intensity levels of all luminaries of the system 10 with one command. A multicast message must only contain either the periodic function itself or an indication to the periodic function and the column 1 as start for the periodicity. When a luminary receives the multicast message, it can determine its intensity level from the periodic function and the start column. For example, all luminaries at the logical positions "A1" to "E1", "A3" to "E3", and "A5" to "E5" can determine from the periodic function and their columns "1", "3" and "5" that their lighting intensity should be set to "0", while the luminaries at the logical positions "A2" to "E2" and "A4" to "E4" can determine from the periodic function and their columns "2" and "4" that their lighting intensity should be set to "2".

Another example is a function I(,x,y,t,T,E) is a function defined as follows:

$I(x,y,t,T,E)=$ $I_{work}(0.9x+0.8y)(1+(t-t_0)/t_0)(1+(E-E_0)/E_0)$ if 8 am<t<20 pm $I_{min}$ if 20 pm<t<8 am Here we observe that each luminaire will automatically adapt its light settings depending on the time, the room temperature, and external light temperature (contextual properties). The same function allows each lumianire to choose specific light settings depending on its location (x,y). The specific coefficients associated to those location variables can be dependent, e.g., on the specific distribution of windows in the room that require more light in those positions with a high x or y value.

In the following, three main methods based on the above general concept of the invention that address three different type of scenarios are briefly outlined:

Scenario 1: Multicast to a set of q nodes to create a personalized light spot—Such a scenario is motivated by a user carrying a personalization token (e.g., a smart phone) who uses it to adapt the light settings in his direct surrounding according to some given preferences. The user can enter for example in a lighting control software installed on his smartphone to create a personalized spot on his location. The smartphone software can then determine the position for example by using a built-in GPS receiver, select the "personalized spot"-function and create a multicast message containing the selected function and the actual position of the user. This multicast message can be transmitted from the smartphone, for example using some wireless transmission technology such as WiFi™ to the network of the lighting system. Each luminary from the lighting system can then determine its intensity by processing the received multicast message. A luminary can for example either extract the "personalized spot"-function from the received message or load it from an internally stored set of predetermined functions. Then, it can calculate from the user's position contained in the message its distance to the user's position and use the calculated distance as an input to the "personalized spot"-function in order to calculate its lighting level.

Scenario 2: Broadcast to create a given light setting in the whole environment—such a use case is motivated, e.g., by an office scenario in which the light sources should adopt a given light pattern at a given moment to reduce the amount of consumed energy.

Scenario 3: Broadcast to create a given periodic light setting in the whole environment or throughout the network of lighting sources—such a use case is motivated by a large installation of light sources used for decoration. In such a use case, it is wished to allow the light sources to adapt is light settings in a fast way according to a given lighting pattern (as explained above with regard to FIG. 2, where luminaries arranged in a grid are set with a single multicast message to a periodic light pattern).

Even if the above description is focussed on setting the luminaires to some intensity values, the same principles can be applied to commands that are used to dim the luminaires to some value, or that otherwise specify some dynamical effect. Also, these principles can be applied that set the light to some (mixture of) color(s) rather than some intensity value.

Next, embodiments of the format of multicast messages according to the invention are described, which can be transported in networking protocols. In general, a message comprises a header and a payload. The header includes fields such as destination address and the payload includes the transported information. In the multicast context, a multicast address is defined, which can be used by a node to decide whether a message is destined for it or not. This can be done by constructing the destination address contained in the header of a message as depicted below.

| Type Message | X | Y | Features |
|---|---|---|---|

The field "Type message" would represent the type of address (unicast, multicast, broadcast). Two bits can be used for this. For instance, 00 can be used to identify unicast messages within a network; 01 for multicast messages, and 11 for broadcast messages.

In the case of multicast messages (01), the two additional fields "X" and "Y" might identify the X and Y coordinates of leading luminary defining, e.g., the origin of the function F used to create a personalized light spot around coordinate (x,y). These two fields can contain a logical position of a lamp or luminary or an absolute position such as GPS coordinates.

Finally, the field "Features" defines specific characteristics of the multicast address. For instance, if a personalize light spot around luminaire (x,y) of width W is defined, the field "Features" could include a first subfield to identify the type of multicast (e.g., personalized light spot) followed by another field indicating the width. This is depicted below.

| Multicast type | Width |
|---|---|

Such a construction can be applied to existing wireless communication protocols such as ZigBee™ or 6LoWPAN. For instance, in 6LoWPAN a lighting IP network can be defined in which all the devices have the same network prefix in the address. Next, unicast addresses have a zero identifying the unicast messages.

| Network Prefix | 00 | ??? |
|---|---|---|

For multicast messages, 01 is used after the network prefix followed by the fields "X", "Y", and "Features" as described above.

| Network Prefix | 01 | X | Y | Features |
|---|---|---|---|---|

For instance,

| Network Prefix | 01 | 1010 | 0011 | 000||011 |
|---|---|---|---|---|

Indicates that the central luminary is in positions (10,3) and the multicast function 0 with a radio equal to 3 should be used.

Finally, broadcast messages are constructing by adding ones after the network prefix.

| Network Prefix | 11 | 1111....11 |
|---|---|---|

The invention can be applied to networked lighting systems and used to improve the control of a networked lighting system in that an efficient message format is defined to control several luminaries of a networked lighting system. The invention is the basis for a (set of) standardized command(s) or messages in a lighting control standard such as ZigBee™ or 6LoWPAN. Many deployment scenarios would benefit by the availability of such a command or message.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A luminary for a networked lighting system comprising:
a receiver for receiving a multicast message from a lighting controller of the networked lighting system, wherein the multicast message comprises a luminary related information field identifying several selected luminaries and a features field identifying a predetermined function, wherein the predetermined function includes input values corresponding to location information for each luminaire of a plurality of selected luminaries and said input values corresponding to contextual information, the contextual information including a room temperature and a time value associated with each luminaire of the plurality of selected luminaries for each luminaire of the plurality of selected luminaries to adapt light settings using the predetermined function, and generate as output values, individual, differentiated control information for each luminaire of the plurality of selected luminaries, wherein the output values for the luminary are different from at least one other luminary of the plurality of selected luminaries using the same predetermined function and based at least in part on a difference in location information between the luminary and the at least one other luminary of the plurality of selected luminaries; and a controller being configured to execute the predetermined function using the features field of the multicast message and the luminary related information field of the multicast message to calculate the individual, differentiated control information for the luminary, the controller being further configured to set a lighting configuration created for the luminary in accordance to the luminary control information, wherein the lighting configuration created for the luminary is different from lighting configuration for the least one other luminary of the plurality of selected luminaries.

2. The luminary of claim 1, where the predetermined function comprises at least one of:
a step function,
a polynomial, and
a periodic function.

3. The luminary of claim 1, wherein the predetermined function includes multiple functions for controlling different specific control information, and wherein a first function controls an intensity level and a second function controls at least one of: a dimming value, a color settling value, a beam width, and a beam direction.

4. The luminary of claim 1, wherein the controller is further configured to execute the predetermined function using the location information of the luminary and at least one of: a time value, a room temperature or an environmental light value and determine the control information for the luminary, wherein the control information includes an intensity level of the luminary.

5. The luminary of claim 1, wherein the predetermined function associates the location information for the plurality of selected luminaries and contextual information as input related to the control information.

6. The luminary of claim 5, wherein the contextual information comprises at least one of: time, room temperature, light level, room occupancy, and activity in the room.

7. The luminary of claim 1, wherein the predetermined function is parameterized and the features field further comprises parameters of the predetermined function.

8. The luminary of claim 7, wherein the controller is further configured to calculate the predetermined function using the parameters included in the features field of the multicast message.

9. A method for determining lighting control information at a luminary of a networked lighting system, the method comprising:

receiving, at the luminary, a multicast message comprising a features field identifying a predetermined lighting function;

determining the lighting control information for the luminary by executing the predetermined lighting function using location information of the luminary in the networked lighting system and contextual information, the contextual information including a room temperature and a time value associated with the luminary for the luminaire to adapt light settings using the predetermined lighting function, and, wherein the lighting control information is individual and differentiated relative to other luminaires of a plurality of luminaires in the networked lighting system, wherein the lighting control information determined for the luminary is different from at least one other luminary of the plurality of luminaries using the same predetermined lighting function and based at least in part on a difference in location information between the luminary and the at least one other luminary of the plurality of luminaries; and executing the lighting control information for the luminary to generate the lighting effect for the luminary, wherein the lighting effect generated for the luminary is different from a lighting effect generated for the least one other luminary of the plurality of luminaries using the same predetermined lighting function.

10. The method of claim 9, wherein the predetermined lighting function comprises at least one of:

a step function, wherein the predetermined lighting function comprises a start value for the predetermined lighting function and a difference successive values of the predetermined lighting function;

a polynomial; and a periodic function, wherein the predetermined lighting function comprises a one of a direction and period.

11. The method of claim 9, wherein the predetermined lighting function includes multiple functions for determining different lighting control information, and wherein a first function determines an intensity level and a second function determines comprises at least one of: a dimming value, a color setting value, a beam width, and a beam direction.

12. The method of claim 9, comprising executing the predetermined lighting function to generate a first light intensity level for a first luminaire located at a first position in the networked lighting system, a second light intensity level for a second luminaire located at a second position in the networked lighting system and a third light intensity level for a third luminaire located at a third position in the networked lighting system, wherein the first light intensity level is different from the second light intensity level and the second light intensity level is different from the third light intensity level.

* * * * *